(12) United States Patent
Kitagawa (10) Patent No.: US 9,607,516 B2
(45) Date of Patent: Mar. 28, 2017

(54) REMAINING ENERGY SUPPLY WARNING SYSTEM

(71) Applicant: DENSO CORPORATION, Kariya, Aichi-pref. (JP)

(72) Inventor: Nozomi Kitagawa, Okazaki (JP)

(73) Assignee: DENSO CORPORATION, Kariya (JP)

( * ) Notice: Subject to any disclaimer, the term of this patent is extended or adjusted under 35 U.S.C. 154(b) by 4 days.

(21) Appl. No.: 14/670,555

(22) Filed: Mar. 27, 2015

(65) Prior Publication Data

US 2015/0302749 A1    Oct. 22, 2015

(30) Foreign Application Priority Data

Apr. 16, 2014  (JP) .................................. 2014-84507

(51) Int. Cl.
*G08G 1/137* (2006.01)
*G01F 23/00* (2006.01)
*B60W 10/00* (2006.01)
*G01C 21/36* (2006.01)

(52) U.S. Cl.
CPC ............. *G08G 1/137* (2013.01); *B60W 10/00* (2013.01); *G01C 21/3697* (2013.01); *G01F 23/0061* (2013.01); *G01F 23/00* (2013.01)

(58) Field of Classification Search
CPC ..... G01F 23/0061; G01F 23/00; G08G 1/137; B60L 11/1861; B60L 11/1862; B60L 2260/52
See application file for complete search history.

(56) References Cited

U.S. PATENT DOCUMENTS

| 2005/0237171 | A1* | 10/2005 | Mizumaki | ............... B60K 35/00 340/461 |
| 2010/0106401 | A1* | 4/2010 | Naito | .................. B60L 11/1809 701/533 |
| 2012/0116673 | A1* | 5/2012 | Lee | ..................... G01C 21/3415 701/432 |
| 2013/0238163 | A1* | 9/2013 | Onogi | ...................... B60Q 9/00 701/1 |
| 2014/0132405 | A1* | 5/2014 | Kiefer | ................... B60W 50/14 340/438 |

FOREIGN PATENT DOCUMENTS

| JP | S60-58431 U | 4/1985 |
| JP | 2002-181611 A | 6/2002 |
| JP | 2003-121174 A2 | 4/2003 |
| JP | 2006-199273 A | 8/2006 |
| JP | 2008-256420 A | 10/2008 |
| JP | 4363267 B2 | 8/2009 |
| JP | 2011-133408 A | 7/2011 |
| JP | 2012-68818 A | 4/2012 |
| JP | 2012-158294 A2 | 8/2012 |
| JP | 2013-69227 A | 4/2013 |

\* cited by examiner

*Primary Examiner* — Hongmin Fan
(74) *Attorney, Agent, or Firm* — Posz Law Group, PLC (57) ABSTRACT

A remaining energy supply warning system provides different low fuel level reminders and warnings according to a driving area determined by a navigation apparatus. When within a life domain of the driver, low fuel level reminders and warnings may be set at lower threshold amounts since the driver is well-acquainted with the area. Therefore, the driver of the vehicle will not be bothered by low fuel reminders and warnings when the amount of fuel remaining is still relatively high considering the driver's knowledge of the area.

8 Claims, 4 Drawing Sheets

REMAINING ENERGY SUPPLY WARNING SYSTEM

CROSS REFERENCE TO RELATED APPLICATION

The present application is based on and claims the benefit of priority of Japanese Patent Application No. 2014-084507, filed on Apr. 16, 2014, the disclosure of which is incorporated herein by reference.

TECHNICAL FIELD

The present disclosure generally relates to a remaining energy supply warning system.

BACKGROUND INFORMATION

Conventionally, when a remaining energy supply, or a remaining amount of fuel in a vehicle decreases, a remaining energy supply warning system or a similar system provides a warning, and, after providing such a warning, the system cancels the warning once a gas station is set as a destination of a current travel of the vehicle. Such an example is disclosed in a patent document 1 (i.e., Japanese Patent No. 4363267).

In traveling to the gas station, when the driver is driving the vehicle within his/her "life domain," for example, in a well-known area, or domain of everyday life of the driver within which the driver him/herself is well-acquainted and knows the whereabouts of shops and restaurants, there is very little chance of losing one's way to the destination and running out of fuel.

On the other hand, when the driver is driving the vehicle in a not-so-acquainted-with area, where he/she knows little about which way to go, the chances are greater to lose one's way and running out of fuel.

However, the remaining energy supply warning from the system is always provided for the driver at the same remaining energy supply amount regardless of in which area the driver is driving, i.e., based on the same remaining energy supply amount level wherever the vehicle is. Further, the threshold amount for providing a warning is set to have a value that detonates/triggers the warning well-before the running out of fuel, for the safety of the driver, i.e., in order not to cause the running out of fuel before reaching the gas station.

Therefore, when the warning is provided in the life domain of the driver, the warning may be bothersome for the driver in many cases.

SUMMARY

It is an object of the present disclosure to provide a remaining energy supply warning system which adjusts its warning level according to a driving area determined by a navigation apparatus, for both of a life domain and a non-life domain of the driver.

In an aspect of the present disclosure, a remaining energy supply warning system includes a remaining energy supply meter that determines a remaining energy supply amount of a vehicle energy supply, a position detector that detects a position of a vehicle, and a warning provider (i) that sets an area-specific warning amount level for each of at least two areas, the area-specific warning amount level being different for each of the at least two areas, and (ii) that provides an area-specific warning for each of the at least two areas based on the area-specific warning amount level for each of the at least two areas when a current position of the vehicle corresponds to one of the at least two areas and the remaining energy supply amount of the vehicle energy supply is equal to the area-specific warning amount level. The remaining energy supply warning system also includes a reminder provider (i) setting an area-specific reminder amount level to the at least two areas, and (ii) providing an area-specific reminder based on the reminder amount level that is higher than a lowest warning amount level when the current position of the vehicle corresponds to an area having the lowest warning amount level and the remaining energy supply amount of the vehicle energy supply is equal to the reminder amount level. The area-specific reminder from the reminder provider has a lower intensity than the area-specific warning from the warning provider.

Also, in an aspect of the present disclosure, the remaining energy supply warning system includes a refill position memory that stores position information about a position of a refill station for refilling the vehicle energy supply, and a refill position presenter that presents the position information about the position of the refill station that is close to a current position of the vehicle when the warning or reminder provider provides the warning.

Further, in an aspect of the present disclosure, the remaining energy supply warning system includes a life domain set designator that designates an area as a life domain of a driver of the vehicle, and a warning level set designator that designates, to the area of the life domain, the lowest warning amount level.

Additionally, in an aspect of the present disclosure, the warning provider intermittently provides the area-specific warning.

Still further, in an aspect of the present disclosure, the warning provider provides the area-specific warning at gradually shorter intervals.

Moreover, in an aspect of the present disclosure, the remaining energy supply warning system includes a driver identity determiner determining an identity of a driver of the vehicle, and the warning provider provides the warning amount level and reminder provider provides the reminder amount level according to the identity of the driver.

Yet further, in an aspect of the present disclosure, the remaining energy supply warning system includes a third warning provider providing the warning when (i) a current driver is different from a previous driver and (ii) the remaining energy supply amount of the vehicle energy supply has decreased by an amount equal to or greater than a preset amount.

In addition, in an embodiment of the present disclosure, a navigation device has a fuel remaining energy supply warning system that includes a remaining energy supply meter that determines a remaining energy supply amount of a vehicle energy supply, a position detector that detects a position of a vehicle, a warning provider (i) that sets an area-specific warning amount level for each of at least two areas, the area-specific warning amount level being different for each of the at least two areas, and (ii) that provides an area-specific warning for each of the at least two areas based on the area-specific warning amount level for each of the at least two areas when a current position of the vehicle corresponds to one of the at least two areas and the remaining energy supply amount of the vehicle energy supply is equal to the area-specific warning amount level, and a reminder provider (i) that sets an area-specific reminder amount level to the at least two areas, and (ii) that provides an area-specific reminder based on the reminder amount level that is higher than a lowest warning amount level when the current position of the vehicle corresponds to an area having the lowest warning amount level and the remaining energy supply amount of the vehicle energy supply is equal to the reminder amount level. The area-specific reminder from the reminder provider has a lower notification intensity than the area-specific warning from the warning provider.

When an area which has, for example, the lowest warning level set up thereto is the life domain of the driver, the warning of the remaining energy supply amount will not be provided until/after the remaining energy supply amount decreases to the lowest level.

Therefore, the driver of the vehicle will not be bothered by the remaining energy supply warning due to a too-early warning when the remaining supply amount of the fuel is still relatively high, may be reduced. That is, the driver of the vehicle will not be bothered by low fuel reminders and warnings when the amount of fuel remaining is still relatively high considering the driver's knowledge of the area.

On the other hand, even in the life domain of the driver, when the fuel decreases to a remind level which is somewhat higher than the warning level, a "remind" warning is provided, which is weaker, or softer, than the warning from the warning provider.

Therefore, in the present disclosure, the system provides the remaining energy supply warning for the driver in the life domain without bothering him or her.

Now, in a non-life domain of the driver, the remaining energy supply warning system provides the warning from the warning provider at a higher-than life domain level, i.e., at a timing before the fuel decreases to the warning level in the life domain.

Therefore, in the non-life domain, the warning is provided from the system for the driver appropriately at a no-anxiety timing, i.e., before the driver feels uneasy about the running out of fuel in an unfamiliar area.

The numerals in the claims and in the drawings establish only an exemplary association therebetween, and thereby not limiting the claimed elements to the one in the embodiments.

BRIEF DESCRIPTION OF THE DRAWINGS

Objects, features, and advantages of the present disclosure will become more apparent from the following detailed description made with reference to the accompanying drawings, in which.

DETAILED DESCRIPTION

The embodiment of the present disclosure is described with reference to the drawings.

The present embodiment is related to a navigation device 1 to which the fuel remaining energy supply warning system of the present disclosure is applied.

Figure 1:
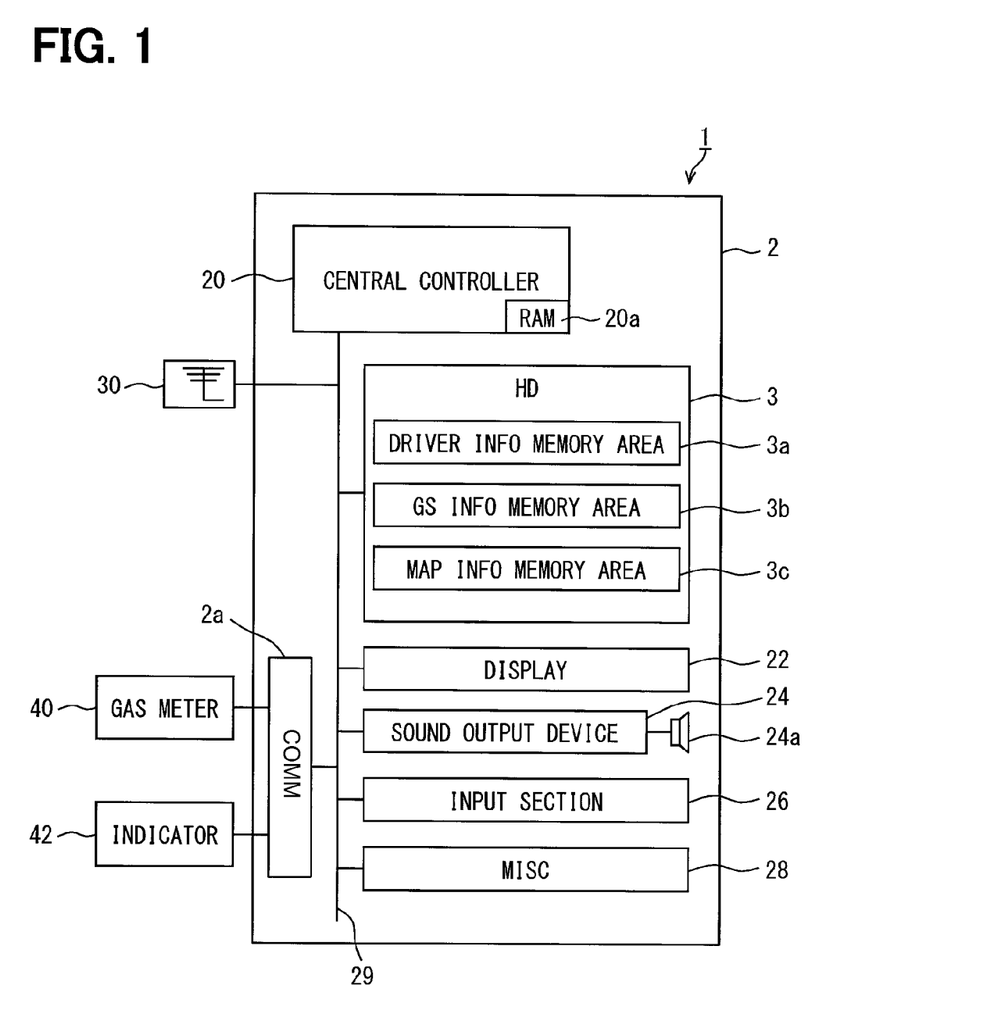
FIG. 1 is a block diagram of a navigation apparatus in one embodiment of the present disclosure.

The navigation device 1 consists of a body part 2 and a GPS antenna 30 connected to the body part 2, as shown in FIG. 1. The body part 2 is provided with a central controller 20 that has a CPU, a ROM, a RAM 20a, etc. of well-known type.

The body part 2 is also provided with a hard disk 3 (i.e., HD 3) as a storage device, together with a display 22, a sound output device 24, and an input section 26, as well as miscellaneous devices 28 required for other functionality.

The body part 2 is provided with a communication apparatus 2a, and is communicably connected with a gas meter 40 or an ECU (not illustrated) of an indicator 42 via CAN etc. through this communication apparatus 2a.

The central controller 20 communicates via a bus 29 with the hard disk (HD) 3, the display 22, the sound output device 24, the input section 26, other devices 28, the GPS antenna 30, an external observation camera 32, and a biometric signal obtainer device 34. Further, the central controller 20 performs various processes in communication with the gas meter 40, the indicator 42 via the CAN or the like, which are described later in detail.

Plural kinds of information are stored in the hard disk (HD) 3, such as, for example, driver information, GS (gas station) information and map information.

These varieties of information are stored in the hard disk (HD) 3, in memory areas in the HD 3, such as driver information memory area 3a, GS information memory area 3b, and the map information memory area 3c.

Among these, the driver information associates information of an ID, or identity, of each driver (i.e., ID information) with fuel timing information, preferred fuel brand information, preferred gas station information, life domain information and the like.

The ID information is information of a driver to identify who is a driver currently driving a vehicle.

In the present embodiment, this ID information is inputted by a driver's operation on the input section 26.

The fuel timing information is information specifying a preferred timing at which the driver wants to perform fueling (e.g., to top off the fuel tank), and the fuel timing in the present embodiment is specified as a fuel timing in a life domain.

As the fuel timing in the present embodiment, the driver specifies how long a travelable distance by the remaining energy supply fuel/gasoline.

That is, as the fuel timing in the present embodiment, the driver can specify how long, or how many kilometers, he/she would like to travel thereafter, i.e., after having a fuel warning from the system based on the remaining energy supply of fuel/gasoline and based on an average fuel mileage, which will be described later in detail.

The preferred fuel brand information is information about the brand, or, in this case an octane level, of the fuel. That is, a regular gasoline, a high-octane gasoline or the like may be specified as the fuel brand information.

The preferred gas station information is information about the name of the gas station the driver usually uses.

The life domain information is information about the area, or the sphere, of life of the driver. That is, based on the positions of the home, the school, the company or the like specified by the driver, a geographical area including all those positions is set as the life domain in the present embodiment.

Here, the positions of the home, the school, the company, etc. specified by a driver are memorized as the life domain information.

The GS information is information that associates position information of each of the gas stations with the brand information of the gasoline sold at those gas stations.

The map information is image information for displaying a map on the display 22.

The map information is used for route guidance from the system for the driver, and is also used to display the position of a gas station for the driver, i.e., for a display of a GS icon on the screen of the display 22. In this map information, various position information is included. That is, for example, position information of various buildings, such as a gas station, as well as road structure information and the like are stored in association with the image information.

The display 22 in the present embodiment is a so-called built-in liquid crystal-type image output device that has the liquid crystal screen exposed from one side of the case of the navigation device 1.

When installed in a vehicle, the navigation device 1 has this screen of the display 22 exposed toward a compartment in the vehicle.

The sound output device 24 is a device for outputting a warning sound from a loudspeaker 24a etc. according to a process which is described later in detail.

The input section 26 consists of two or more manual operation buttons and the like, and those buttons are positioned around the screen of the display 22. The buttons of the input section 26 at least have sufficiently diverse variety, i.e., numbers and types of the keys for allowing the driver to input his/her ID as the ID information described above.

The GPS antenna 30 is a device for receiving position measurement signals from each of the GPS Satellites, for computing the position of the self-vehicle which carries the navigation device 1 based on the received signal, and transmits to the central controller 20 on demand at any time the computed information as the position information.

The central controller 20 stores the position information to RAM 20a, upon receiving the position information from the GPS antenna 30. The stored position information is erased from the RAM 20a after a preset memory time.

The gas meter 40 is a device installed in a gasoline tank, which is used by the central controller 20 to recognize/grasp the residual amount of the gasoline in the tank.

When the signal about the remaining energy supply gasoline is obtained from the gas meter 40, the central controller 20 of the present embodiment stores to the RAM 20a the obtained information as remaining energy supply gasoline information. The remaining energy supply gasoline information is updated as required, while a warning process mentioned later is performed.

The indicator 42 is a device for lighting up the lamps and other devices under control of the central controller 20.

Whenever required, the central controller 20 of the present embodiment controls the indicator 42 to turn ON the lamps according to the warning process mentioned later.

Next, a specification process performed by the central controller 20 of the navigation device 1 mentioned above is described with reference to FIG. 2.

Figure 2:
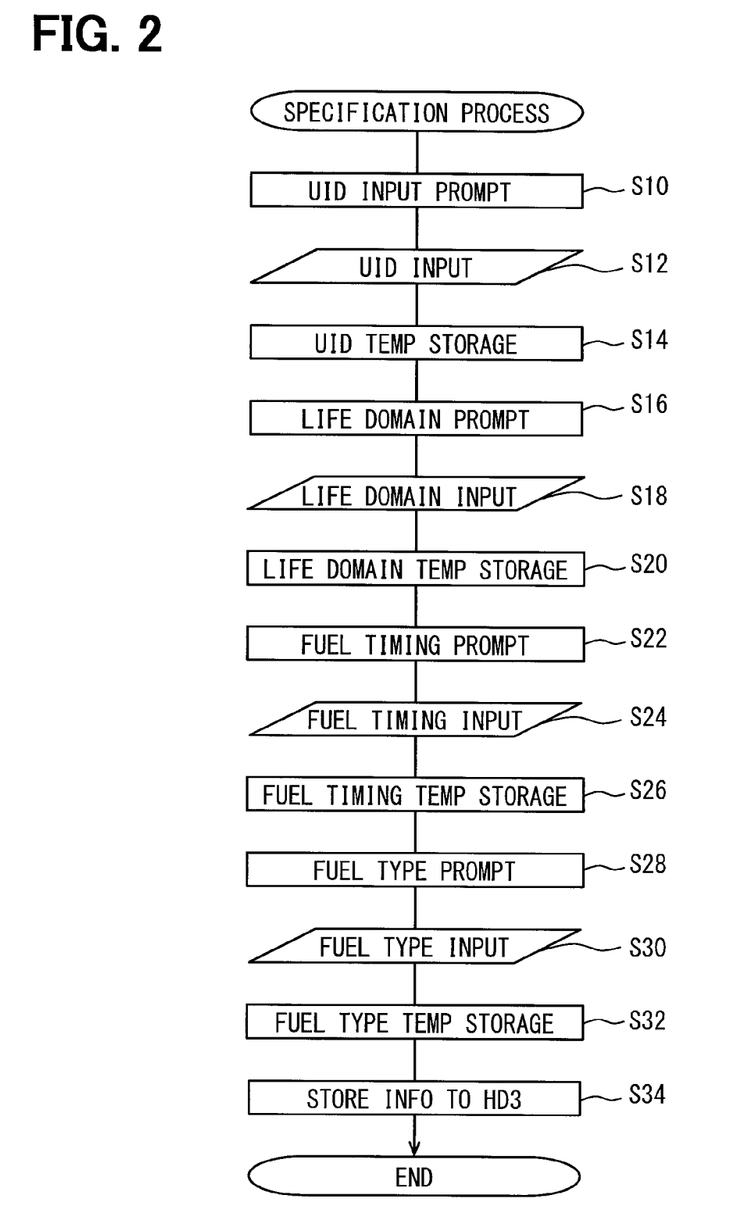
FIG. 2 is a flowchart of a specification process in the one embodiment of the present disclosure.

The system performs the specification process once/one time before refueling or fueling the vehicle. Further, when the driver wanted to change the setting of the system, the specification process is performed.

In the following, unless otherwise described, the process performs the steps in an ascending order of step numbers.

The specification process is started and is performed starting from S10, when the driver of the vehicle operates the input section 26 and inputs a start instruction to start an execution of this specification process.

In S10, an announcement is provided for the driver, prompting the driver to input the ID information of him/herself (i.e., UID or user ID in FIG. 2).

For example, from the sound output device 24, a message is provided for the driver, which may sound "Please input ID information" or the like.

In S12, the driver operates the input section 26 and ID information is inputted therefrom.

In S14, the process stores temporarily in the RAM 20a the ID information inputted in S12.

In S16, an announcement is provided prompting the driver to specify the life domain.

For example, from the sound output device 24, a message is provided for the driver, which may sound "Please specify a life domain" or the like.

In S18, the driver operates the input section 26 to specify a life domain of his/hers.

The specification of the life domain is actually an input of a "center" position of the life domain, which may be a position of one's home/house, a school to attend, a company to work for, or the like.

The specification of the life domain may be performed as an input of the street address, an input of the telephone number or the like.

Alternatively, the system may "correct" a life domain based on the travel history, or a log, of the driver, for the life domain to be more accurately reflecting his/her life.

After the input in S18, the process in S20 stores the position information of all positions, i.e., the home, school, company and the like, temporarily in the RAM 20a by searching the home and others based on the map information. The life domain information is stored in association with the ID information in the RAM 20a.

The search in S20 may be performed by any method.

In S22, a fuel timing specification announcement is provided for the driver, prompting him/her to specify the fuel timing.

For example, from the sound output device 24, a message is provided, which may sound "Please specify the fuel timing."

In S24, the driver operates the input section 26 and the fuel timing is specified therefrom.

For example, the fuel timing in the life domain may be specified, for example, as a travelable distance of 50 km, 150 km or the like. The fuel timing may also be specified as a remaining energy supply amount of the gasoline in the tank. In the present embodiment, the fuel timing is specified as a travelable distance of 50 km which is travelable by a remaining energy supply amount of the gasoline in the tank.

In S26, after the input in S24, the process temporarily stores in the RAM 20a the inputted information as the fuel timing information. The fuel timing information is stored in association with the ID information In the RAM 20a.

Next, in S28, an announcement is provided for the driver, prompting him/her to specify a fuel type, i.e., about the fuel brand and the gas station name.

For example, from the sound output device 24, a message is provided for the driver, which may sound "Please specify a fuel brand and a gas station name."

In S30, the driver operates the input section 26 and the fueling brand and the gas station name are input therefrom.

More practically, the gasoline grade such as a regular gasoline, a high-octane gasoline, or the like, and the gas station selling such gasoline is specified in S30.

In S32, after the input in S30, the process temporarily stores in the RAM 20a fuel type information (i.e., the fuel brand information and the gas station information). The information is stored in the RAM 20a in association with the ID information.

In S34, the information is stored to the hard disk (HD) 3. That is, the information stored in the RAM 20a in association with the ID information, such as the life domain information, the fuel timing information, the brand information, and the gas station information, are transferred to the hard disk (HD) 3, and, after performing S34, the specification process is finished.

Next, a warning process performed by the central controller 20 of the navigation device 1 mentioned above is described with reference to FIG. 3.

Figure 3:
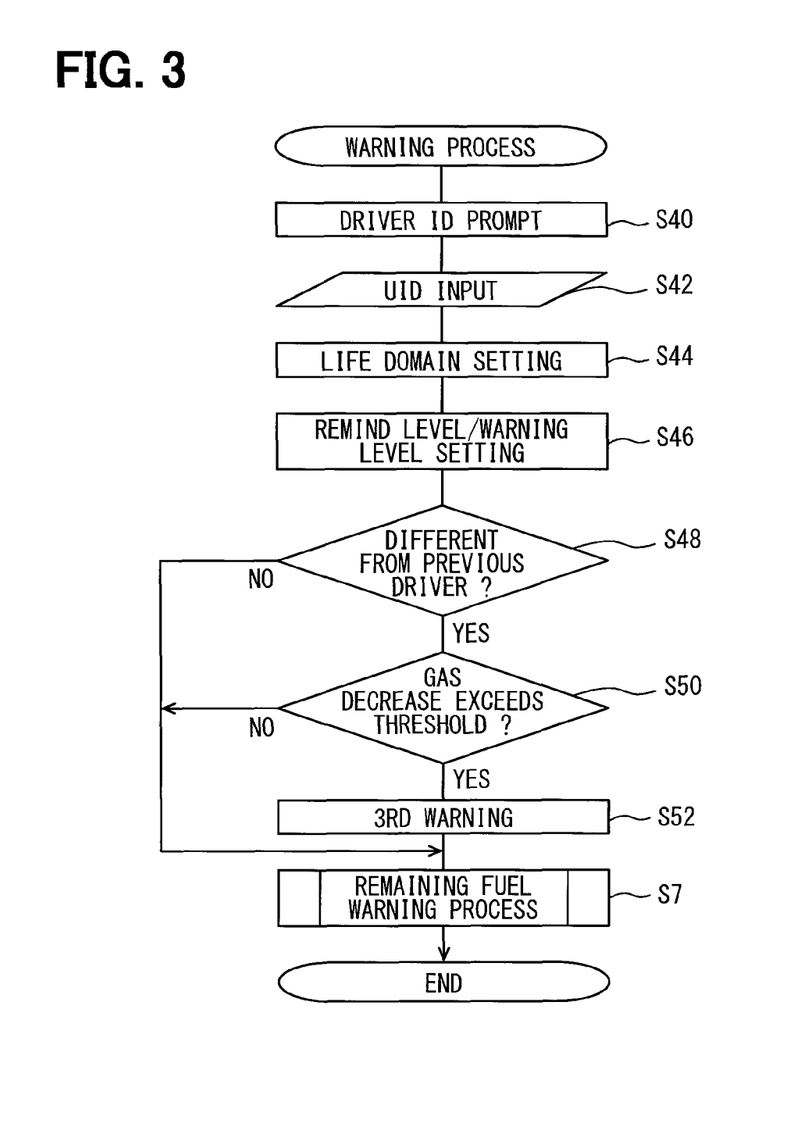
FIG. 3 is a flowchart of a warning process in the one embodiment of the present disclosure.

Unless otherwise described, the process in the following performs the steps in an ascending order of step numbers.

The warning process is performed from S40, when the driver operates the input section 26 to input a process start instruction for starting thereof.

In S40, an announcement is provided for the driver, prompting him/her to input UID, or the user ID, that is, the ID information.

For example, from the sound output device 24, a message is provided for the driver, which may sound "Please input the ID information."

In S42, the driver operates the input section 26 and the ID information is inputted therefrom.

In S44, information is retrieved from the hard disk (HD) 30 to be temporarily stored in the RAM 20a, which is more practically be the life domain information, the fuel timing information, the fuel brand information, and the gas station information all associated with the inputted ID information. The process in S44 further specifies the life domain of the driver based on the life domain information and the map information.

In the present embodiment, if the position information of a home, a school, a company, etc., is stored as the life domain information, the life domain is set as an area including each of those, i.e., home, school, company.

However, such a setting of the life domain is only one example, and life domain setting is not necessarily limited thereto.

The life domain information defining a certain area as the life domain is stored in the RAM 20a.

In S46, a remind level and a warning level to be used in a remaining energy supply warning process mentioned later are respectively set.

Among these levels, the warning level in a life domain is set up based on the fuel timing information stored in the RAM 20a.

The remind level in a life domain may be set up as a two-fold distance of the fuel timing, which may be a travelable distance of 100 km in the present embodiment.

The warning level in a non-life domain may be set as a three-fold distance of the fuel timing, which may be a travelable distance of 150 km in the present embodiment.

Alternatively, the remind level in the life domain and the warning level in the non-life domain may be specified arbitrarily by the driver.

Further, the warning levels and the remind levels may be a pre-fixed level, i.e., predetermined travelable distances.

In S48, a driver identity is examined, as to whether the driver inputting the ID information in S42 is different from the previous driver of the vehicle.

For the examination in S48, the ID information input in S42 may be stored in the RAM 20a or in the hard disk (HD) 3 by the next input of the ID information. The ID information stored in such manner may be compared with the ID information input in the next examination time in S48.

When it is determined, in S48, that the driver inputted the ID information in S42 differs from the driver who has used the same vehicle immediately before (S48:YES), the process of S50 is performed next, and when it is determined that the driver is the same (S48:NO), the process of S7 is performed next.

In S50, it is determined whether a preset amount of gasoline is decreased. According to the present embodiment, the central controller 20 records a remaining energy supply amount of gasoline in the RAM 20a during an operation of the navigation device 1, which enables a comparison of a very end amount of remaining energy supply gasoline in the last operation of the navigation device 1 with the amount detected in the current process of S50. Such storage of remaining energy supply amount information may be performed either by the RAM 20a, or by the HD 3, or by the other device.

The remaining energy supply amount of gasoline recorded at the end of the last operation and the remaining energy supply amount of gasoline currently recorded in an execution time of S50 in the RAM 20a are compared in the above-described manner, and it is determined whether the difference therebetween is greater than the preset amount (i.e., a threshold) defined in advance.

In S50, when the difference is equal to or greater than the preset amount (S50:YES), the process of S52 is performed next, and when the difference is less than the preset amount (S50:NO), the process of S7 is performed next.

In S52, a third warning outputting a message "a gasoline is decreasing" or the like is performed. This third warning is performed via the sound output device 24.

When the current driver currently driving the vehicle is different from the previous driver, by performing the process of S50 and S52, a decrease of gasoline by a more-than-expected amount is warned for the current driver. That is, a memory-base expectation of the remaining energy supply amount of gasoline of the current driver may be corrected by such an announcement from the system, telling him/her that the remaining energy supply amount of gasoline is decreasing and is greatly different from the memory-base remaining energy supply amount based on the actual remaining energy supply amount.

Therefore, even when there is a big difference between the memory-based expected remaining energy supply amount and the actual remaining energy supply amount which may delay the refuel timing, the running out of remaining energy supply gasoline is effectively prevented by such announcement.

The process of S7 is performed next after S52.

Next, a remaining energy supply warning process performed by the central controller 20 of the navigation device 1 mentioned above is described with reference to FIG. 4.

Figure 4:
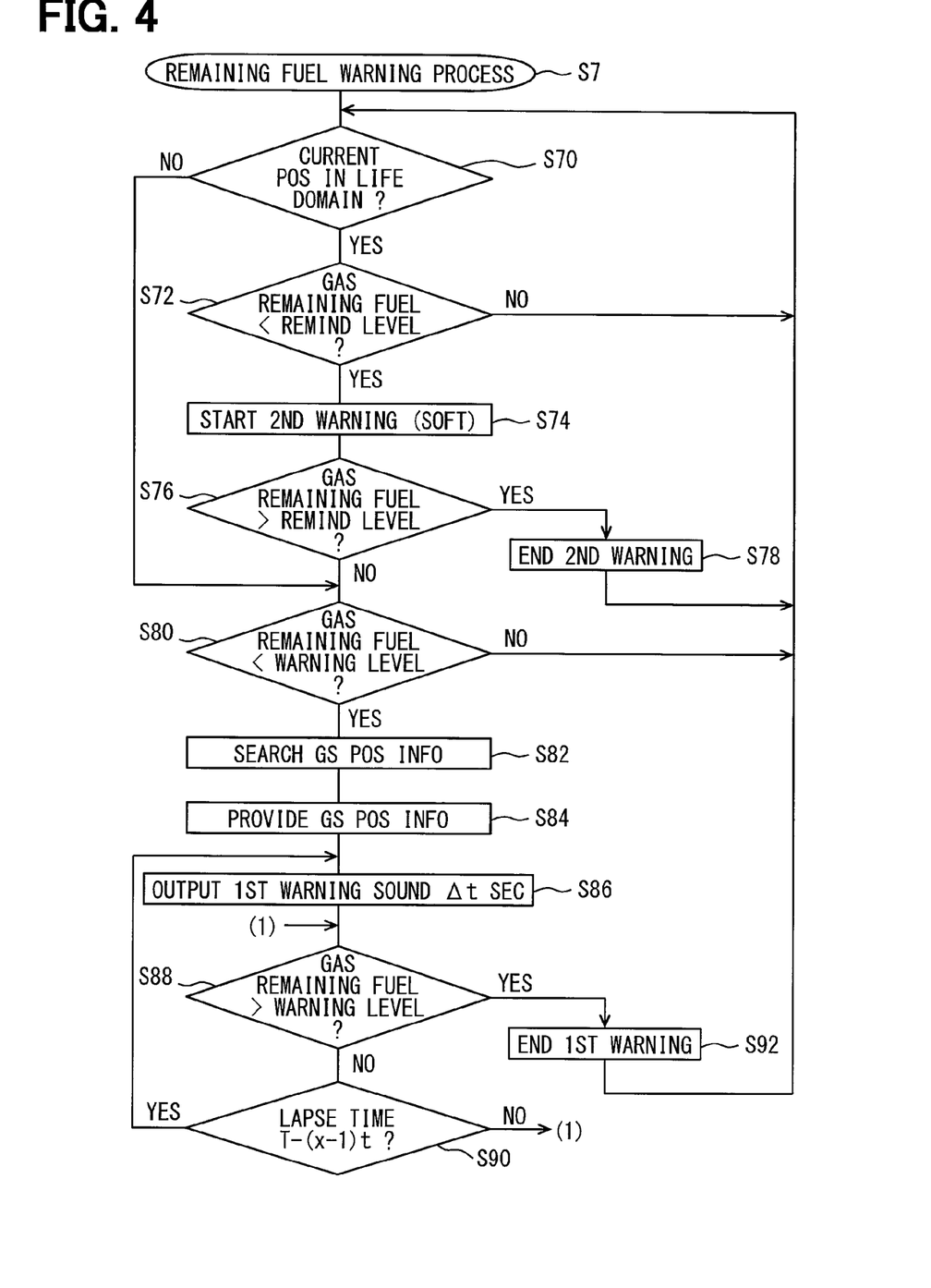
FIG. 4 is a flowchart of a remaining energy supply warning process in the one embodiment of the present disclosure.

In the following, unless otherwise described, the process performs the steps in an ascending order of step numbers.

This remaining energy supply warning process is the last process S7 of the warning process mentioned above.

This remaining energy supply warning process is started with S70.

In S70, the process determines whether a current position is in the life domain of the driver.

In the navigation device 1, after starting the operation thereof, current position information is inputted to the central controller 20 at a fixed interval from the GPS antenna 30, and it is recorded in the RAM 20a.

Therefore, in S70, it is determined, based on the latest current position information recorded in the RAM 20a and the life domain information specified in S44, whether the vehicle in located in the life domain.

That is, in the present embodiment, it is determined whether the vehicle is in an area which includes the home, school, company, etc.

When it is determined that the vehicle is located in the life domain in S70, (S70:YES), the process of S72 is performed next, and when it is determined that the vehicle is not located in the life domain (S70:NO), the process of S80 is performed next.

In S72, it is determined whether the remaining energy supply amount of gasoline is less than the remind level. According to the present embodiment, when the navigation device 1 operates, remaining energy supply gasoline amount information is inputted from the gas meter 40, and the RAM 20a records such information.

In S72, it is determined, based on the latest remaining energy supply gasoline amount information stored in the RAM 20a, whether the remaining energy supply amount of gasoline is less than the remind level which is set in S46.

When the process in S72 determines that the remaining energy supply amount of gasoline is less than the remind level (S72:YES), the process of S74 is performed next, and when the process in S72 determines that the remaining energy supply amount of gasoline is equal to or greater than the remind level (S72:NO), the process of S70 is performed again.

Then, a reminder is performed in S74.

This reminder is a warning performed as a turning ON of the lamp under control of the indicator 42 in the present embodiment.

The reminder is a warning which is not as strong as a warning mentioned later, which strongly warns the driver by an output of a voice or the like. That is, the reminder is a warning weaker or softer than the warning. In other words, the reminder has a lower notification intensity/magnitude/degree (i.e., weaker/softer sound, less urgent message) than the warning.

By performing this reminder, the driver knows that the gasoline is decreasing and the warning may be performed soon.

Since the driver knows where the gas station is in the life domain, the driver may only be bothered and become uncomfortable if a strong warning is provided for him/her at the remind-level remaining energy supply amount of gasoline.

However, it may be convenient for the driver to at least recognize that the gasoline is decreasing by having the warning, thereby it enables the system to present information for the driver, in terms of letting him/her know that the remaining energy supply amount of gasoline is decreasing without bothering the driver too much to be uncomfortable.

In S76, it is determined whether the remaining energy supply amount of gasoline becomes equal to or greater than the remind level. This determination is performed in the same manner as S72. Specifically in S76, it is determined whether the gasoline is refueled or not.

When the gasoline has been refueled (S76:YES), the process of S78 is performed next, and the warning is stopped.

On the other hand, when the gasoline has not been refueled (S76:NO), the process of S80 is performed next.

In S80, it is determined whether the remaining energy supply amount of gasoline is less than the warning level. This determination is performed in the same manner as S72.

When it is determined in S80 that the remaining energy supply amount of gasoline is less than the warning level (S80:YES), the process of S82 is performed next, and when it is determined in S80 that the remaining energy supply amount of gasoline is equal to or greater than the warning level (S80:NO), the process of S70 is performed again.

In S82, the process searches the position information of the gas station located close or within a range of the self-vehicle, that is, for example, within a 50 km radius of the self-vehicle. More practically, the map information stored in the map information memory area 3c, which includes the position information of the gas stations, is used for such a search in S82. The process in S82 may pick up each of the gas stations that are positioned in the life domain in which the vehicle is positioned.

Then, from among the gas stations picked up in the above manner, the gas stations having a matching fuel brand and station name in the GS information which has been retrieved in S44 are further picked up from the GS information memory area 3b.

In S84, the process displays the position of the picked-up gas stations on the map image, i.e., on the display 22. For example, a map with arrow marks pointing the picked-up gas stations is provided for the driver.

In such manner, when the warning is provided in S86 mentioned later, the position of the gas stations can be grasped by the driver easily and quickly. Further, the map with gas station arrow marks is displayed when the remaining energy supply amount of gasoline falls to be less than the warning level in S80, the driver can visually recognize that the remaining energy supply amount of gasoline is very little.

The warning is performed in S86.

As the warning in the present embodiment, the process outputs a warning sound from the sound output device 24. The warning is a warning which strongly warns the driver, i.e., a stronger warning than the reminder.

By providing such a strong warning, the driver recognizes that the remaining energy supply amount of gasoline is decreasing to a near running outrun out level.

However, in the present embodiment, the fuel timing is different for the life-domain case (i.e., when the vehicle is in the life domain and the reminder is provided) and for the non-life-domain case (i.e., when the vehicle is not in the life domain and the reminder is not provided).

More practically, when the vehicle is in the life domain, the warning is provided when the travelable distance becomes 50 km, and the vehicle is not in the life domain, the warning is provided when the travelable distance becomes 150 km.

This warning provision scheme is devised because, in the life domain, the driver knows where the gas station is which affords the driver to quickly refuel the vehicle even when the remaining energy supply amount of gasoline is decreased to the warning level, while, not in the life domain, the driver may have difficulty in finding the gas station.

Further, when not in the life domain, the warning is provided earlier than the remind level, i.e., at a timing when the travelable distance is longer than the remind level (i.e., a remind level travelable distance 100 km versus a warning level travelable distance not in the life domain 150 km).

This is because the driver not in the life domain should know and plan the refueling as early as possible, for avoiding the running out of gasoline which may be caused by not knowing the whereabouts of the gas stations. That is, in other words, the driver not in the life domain will not be in the same mindset as in the life domain, and will not be bothered by an early warning, or would rather want the early warning.

However, in S86, the process provides a warning sound for $\Delta t$ seconds.

That is, a continuation of the warning sound for a too-long period may bother and irritate the driver, thereby limiting the warning sound output for the preset time such as Δt seconds.

In S88, it is determined whether the remaining energy supply amount of gasoline becomes equal to or greater than the warning level. This determination is performed in the same manner as S72. Specifically in S88, it is determined whether the gasoline is refueled or not.

When the gasoline has been refueled (S88:YES), the process of S92 is performed next.

On the other hand, when the gasoline has not been refueled (S88:NO), the process of S90 is performed next.

In S90, it is determined how much time has lapsed from the warning. More practically, whether the lapse time thereafter is equal to T−(x−1)t seconds is determined, which is longer than the Δt seconds. In this calculation, T is a larger period than Δt seconds, x is the number of intervals, and t is a very short time sufficiently shorter than T.

Therefore, the time T−(x−1)t is actually T seconds for the first return cycle, T−t seconds for the second return cycle, T−2t seconds for the third return cycle in FIG. 4, i.e., a gradually-decreasing interval between two warnings.

In other words, while the lapse time after providing the warning has not reach T−(x−1)t seconds (S90:NO), the warning is not provided again, and, when the lapse time after providing the warning reaches T−(x−1)t seconds (S90:YES), the warning is provided again, i.e., intermittently, at gradually-decreasing intervals.

The interval of the intermittent warning gradually decreases as described above. That is, as the lapse time from the first provision of the warning increases, the time interval between two warnings decreases.

Therefore, in this remaining energy supply warning process, when the remaining energy supply amount of gasoline reaches, i.e., falls down to, the warning level, the warning is provided intermittently.

In other words, the strong warning sound in the warning may give a strong impression of the state of urgency to the driver, which may bother the driver. However, the repeated warning sound in an intermittent manner may limit the bothered feeling of the driver, while securely drawing attention and warning the driver that the remaining energy supply amount of gasoline is decreasing.

Further, by gradually decreasing the interval of the intermittent warnings, the possibility/risk of running out of remaining energy supply gasoline is also conveyed to the driver.

In S92, the process ends the warning, and erases the map displayed in S84, and then the process returns to S70.

The navigation device 1 described above has the following features.

In the present embodiment, when the vehicle is in the life domain, the warning is provided at a low remaining energy supply fuel level in comparison to the level of the warning for not-in-the-life-domain case (S46 in FIG. 3). Therefore, in comparison to the warning provided at the high remaining energy supply fuel level which is more likely to bother the driver, the warning in the life domain is less likely to bother, or give uncomfortableness to, the driver.

On the other hand, even in the life domain, when the fuel decreases to the remind level which is somewhat higher than the warning level, the reminder weaker than the warning is provided.

Therefore, in the present embodiment, by receiving such a warning from the system, the driver in the life domain knows the remaining energy supply amount of fuel is decreasing without being bothered by the warning.

Further, in the non-life domain, where the driver does not know where the gas station is, the warning is provided for the driver at high remaining energy supply fuel level, which is higher than the level for the warning in the life domain.

Therefore, in the non-life domain, the warning can be provided at a no-anxiety timing, i.e., at a suitable timing, before the driver feels uneasy about the running out of fuel.

According to the present embodiment, when the warning is provided, the positions of the gas stations are displayed on the display 22.

Therefore, when the driver wants to refuel the vehicle in response to the warning, he/she can easily recognize the positions of the gas stations for the prevention of the running out of fuel.

Other Embodiments

Although the present disclosure has been fully described in connection with preferred embodiment thereof with reference to the accompanying drawings, it is to be noted that various changes and modifications is apparent to those skilled in the art.

(1) One embodiment described above is an application of the system to a navigation device 1. However, the application of the fuel remaining energy supply warning system of the present disclosure is not necessarily limited to the navigation device. That is, the system may also be applicable to other devices other than the navigation apparatus.

(2) The reminder in the above-mentioned embodiment may be provided as less louder voice than the warning when both warnings are provided by voice. The reminder may also be provided as less glittering/flashy light than the warning when both warnings are provided by the light from the indicator.

The reminder may be provided in other forms, as long as it is provided in a less sensory-organ stimulating manner for the perception by the human sensory organ, in comparison to the warning.

(3) Although the above-mentioned embodiment describes an example of providing a warning about the remaining energy supply amount of gasoline, the system may also be adaptable to provide a warning for other type of energy sources, such as electricity, hydrogen gas, or the like. Further, the warning may be provided for a combination of those energy sources.

(4) Although the above-mentioned embodiment describes an example of two area settings, i.e., a life domain and a non-life domain, three or more areas may also be set for providing the warning. In such case, the plural areas may have respectively different fuel remaining energy supply warning levels.

(5) According to the above-mentioned embodiment, the remind level is not set for the non-life domain. However, the non-life domain may have the remind level setting.

(6) According to the above-mentioned embodiment, the fuel timing is set by specifying the travelable distance. However, the fuel timing may be set by specifying the remaining energy supply amount of gasoline. Further, the fuel timing may be set differently from the above, as long as it appropriately warns the driver.

(7) According to the above-mentioned embodiment, a gas station is considered as a refueling place, or a supply station of energy. However, the refueling place may be other than the gas stations. For example, if the vehicle is an electric vehicle, the refueling place may be a place where an electricity charger is installed, such as convenience stores, department stores or the like.

(8) According to the above-mentioned embodiment, the life domain is defined as an area in which a home, a school, a company, etc. are located. However, the life domain may be defined differently, based on, for example, the travel history and frequented shops or the like, or, based on the roads having greater-than-threshold number of travels and an area within 3 km therefrom. That is, the life domain may be defined arbitrarily.

(9) Each of the components in the present disclosure is defined as an inventive concept, and not limited to a concrete object described above. For example, one component in the above may be divided into two or more sub-components, or functions of plural components may alternatively realized by only one component. Further, a part of the above embodiment may be replaced with other well-known configuration. In addition, a part of the above embodiment may be combined with other embodiments, or may be replaced with other embodiments.

Such changes, modifications, and summarized schemes are to be understood as being within the scope of the present disclosure as defined by appended claims.

What is claimed is:

1. A remaining energy supply warning system comprising:
   a remaining energy supply meter determining a remaining energy supply amount of a vehicle energy supply;
   a position detector detecting a position of a vehicle;
   a warning provider (i) setting an area-specific warning amount level for each of at least two areas, the area-specific warning amount level being different for each of the at least two areas, and (ii) providing an area-specific warning for each of the at least two areas based on the area-specific warning amount level for each of the at least two areas when a current position of the vehicle corresponds to one of the at least two areas and the remaining energy supply amount of the vehicle energy supply is equal to the area-specific warning amount level; and
   a reminder provider (i) setting an area-specific reminder amount level to the at least two areas, and (ii) providing an area-specific reminder based on the reminder amount level that is higher than a lowest warning amount level when the current position of the vehicle corresponds to an area having the lowest warning amount level and the remaining energy supply amount of the vehicle energy supply is equal to the reminder amount level, wherein
   the area-specific reminder from the reminder provider has a lower notification intensity than the area-specific warning from the warning provider.

2. The remaining energy supply warning system of claim 1 further comprising:
   a refill position memory storing position information about a position of a refill station for refilling the vehicle energy supply; and
   a refill position presenter presenting the position information about the position of the refill station that is close to the current position of the vehicle when the warning or reminder provider provides the warning.

3. The remaining energy supply warning system of claim 1 further comprising:
   a life domain set designator designating an area as a life domain of a driver of the vehicle; and
   a warning level set designator designating, to the area of the life domain, the lowest warning amount level.

4. The remaining energy supply warning system of claim 1, wherein
   the warning provider intermittently provides the area-specific warning.

5. The remaining energy supply warning system of claim 4, wherein
   the warning provider provides the area-specific warning at gradually shorter intervals.

6. The remaining energy supply warning system of claim 1 further comprising:
   a driver identity determiner determining an identity of a driver of the vehicle, wherein
   the warning provider provides the warning amount level and the reminder provider provides the reminder amount level according to the identity of the driver.

7. The remaining energy supply warning system of claim 1 further comprising:
   a second warning provider providing the warning when (i) a current driver is different from a previous driver and (ii) the remaining energy supply amount of the vehicle energy supply has decreased by an amount equal to or greater than a preset amount.

8. A navigation device having a fuel remaining energy supply warning system comprising:
   a remaining energy supply meter determining a remaining energy supply amount of a vehicle energy supply;
   a position detector detecting a position of a vehicle;
   a warning provider (i) setting an area-specific warning amount level for each of at least two areas, the area-specific warning amount level being different for each of the at least two areas, and (ii) providing an area-specific warning for each of the at least two areas based on the area-specific warning amount level for each of the at least two areas when a current position of the vehicle corresponds to one of the at least two areas and the remaining energy supply amount of the vehicle energy supply is equal to the area-specific warning amount level; and
   a reminder provider (i) setting an area-specific reminder amount level to the at least two areas, and (ii) providing an area-specific reminder based on the reminder amount level that is higher than a lowest warning amount level when the current position of the vehicle corresponds to an area having the lowest warning amount level and the remaining energy supply amount of the vehicle energy supply is equal to the reminder amount level, wherein
   the area-specific reminder from the reminder provider has a lower notification intensity than the area-specific warning from the warning provider.

* * * * *